United States Patent [19]
Endou

[11] Patent Number: 5,319,248
[45] Date of Patent: Jun. 7, 1994

[54] AUTOMOTIVE VEHICLE SEAT ADJUSTING SYSTEM

[75] Inventor: Yoshimi Endou, Tokyo, Japan

[73] Assignee: Oki Electric Industry Co., Ltd., Tokyo, Japan

[21] Appl. No.: 796,468

[22] Filed: Nov. 22, 1991

[30] Foreign Application Priority Data

Nov. 30, 1990 [JP] Japan .................................. 2-337841

[51] Int. Cl.$^5$ .............................................. G05B 19/42
[52] U.S. Cl. .................................. 307/10.1; 318/568.1; 318/468; 364/424.05
[58] Field of Search .................. 364/424.05; 307/10.1; 318/280, 467, 603, 466, 568.1, 488, 489; DIG. 1 274.6, 275.2, 275.3

[56] References Cited

U.S. PATENT DOCUMENTS

| | | | |
|---|---|---|---|
| 4,888,535 | 12/1989 | Brusasco | 318/568.1 |
| 4,907,153 | 3/1990 | Brodsky | 364/424.05 |
| 5,004,967 | 4/1991 | Ogasawara | 318/568.1 |

Primary Examiner—Sharon D. Logan
Assistant Examiner—Aditya Krishnan
Attorney, Agent, or Firm—Edward D. Manzo

[57] ABSTRACT

An automotive vehicle seat adjusting system according to this invention is constructed to move a seat by a drive circuit. It is also constructed to allow a driver to change, during movement of the seat, the moving speed of the seat as he likes. In the system of this invention, when a signal indicative of the feeling of the driver to the moving speed of the seat is inputted, fuzzy inference is performed in accordance with a speed decision rule to decide an optimal moving speed. The optimal moving speed is decided by a fuzzy inference processor on the basis of the inputted feeling signal and an actual moving speed. The drive circuit is controlled in accordance with the decision at the fuzzy inference processor, whereby the seat is allowed to move at the optimal moving speed.

17 Claims, 9 Drawing Sheets

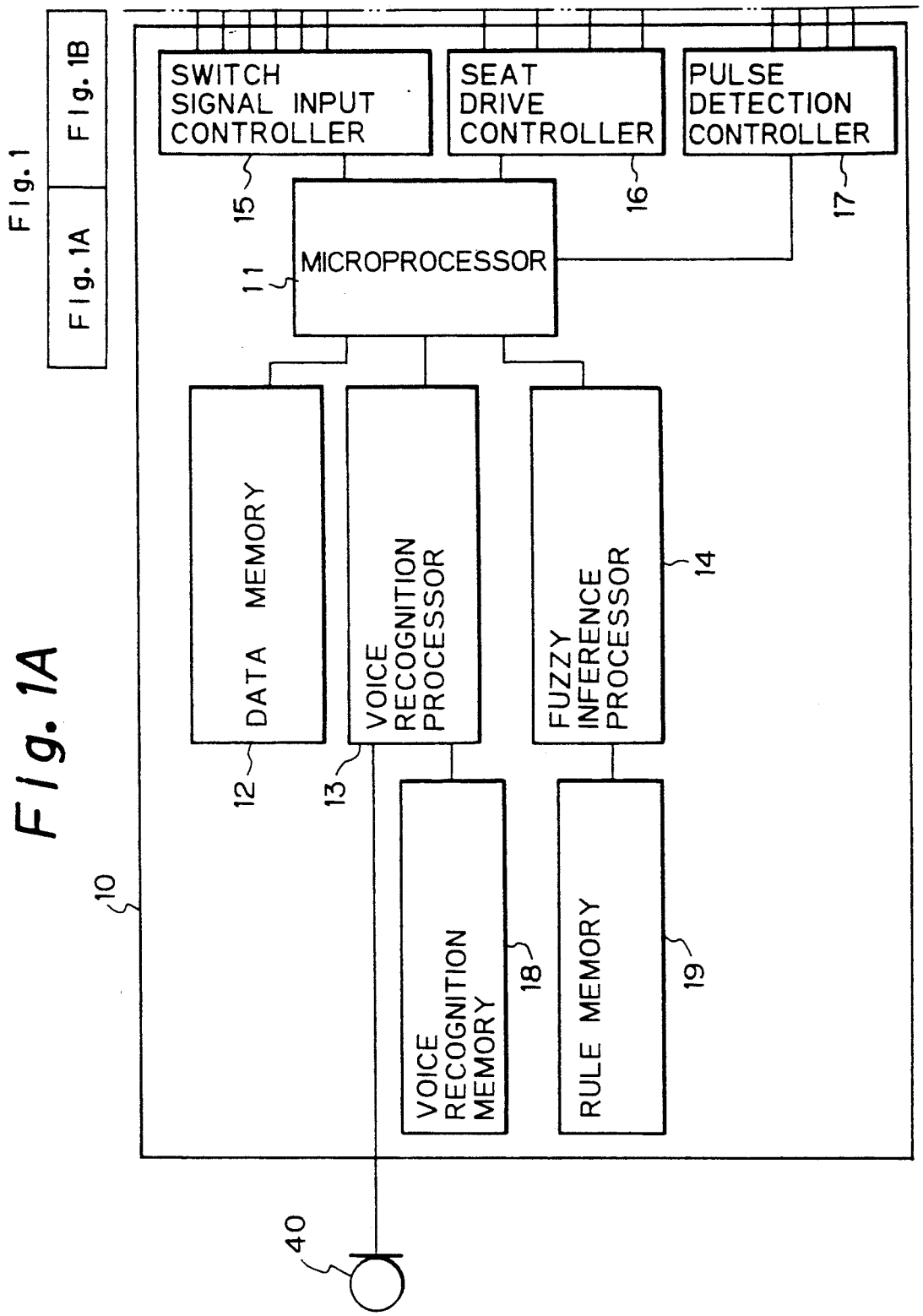

Fig. 4

| RULE FOR FEELING | |
|---|---|
| CONDITION | CONCLUSION |
| IF SLOW. | THEN MAKE FASTER. |
| IF FAST. | THEN MAKE SLOWER. |

| RULE FOR ACTUAL MOVEMENT | |
|---|---|
| CONDITION | CONCLUSION |
| IF SLOW.<br>NORMAL.<br>FAST. | THEN KEEP NORMAL.<br>MAKE FASTER.<br>MAKE VERY FAST. |
| IF SLOW.<br>NORMAL.<br>FAST. | THEN MAKE VERY SLOW.<br>MAKE SLOWER.<br>KEEP NORMAL. |

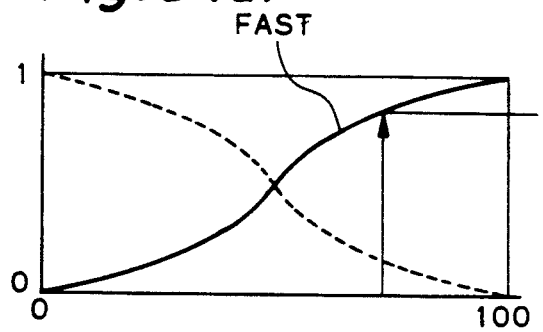
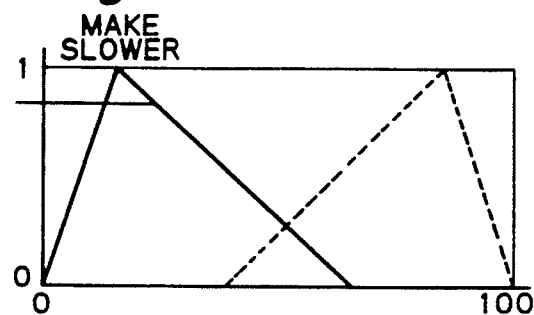
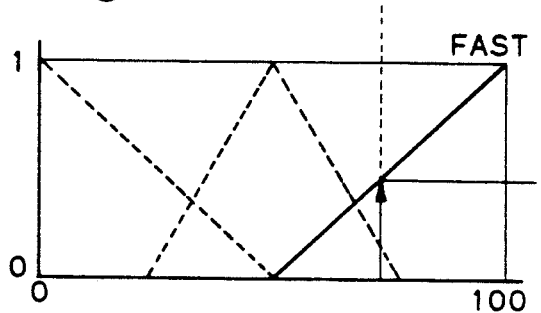
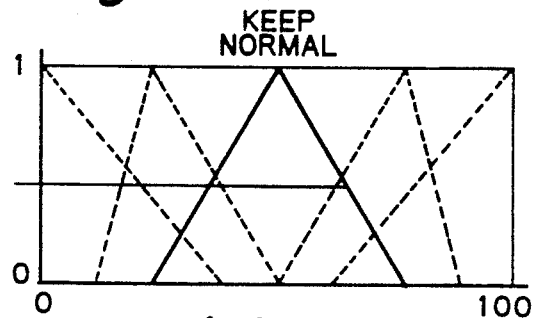
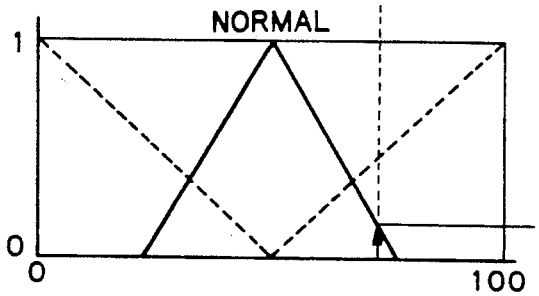
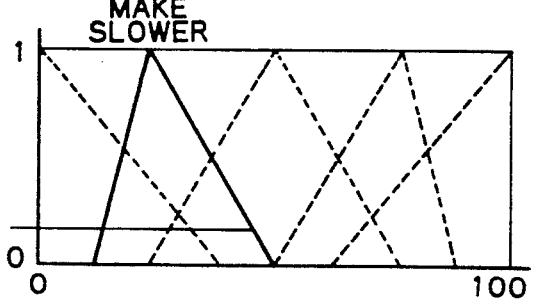
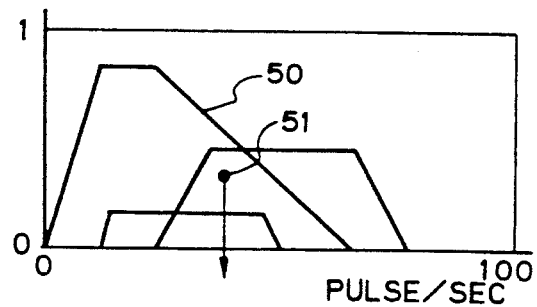

AUTOMOTIVE VEHICLE SEAT ADJUSTING SYSTEM

BACKGROUND OF THE INVENTION

1) Field of the Invention

This invention relates to a system for adjusting a seat in an automotive vehicle.

2) Description of the Related Art

An automotive vehicle seat, especially a driver's seat is generally constructed to permit slide adjustment in which the seat is moved back and forth, reclining adjustment in which the inclination of a backrest of the seat is changed, adjustment in which a front end portion of the seat is moved up and down, and adjustment in which a rear end portion of the seat is moved up and down.

These adjustments are changing from those relying upon manual operation of adjustment levers to those making use of electrical drive. In the seat adjustments by electrical drive, motors are provided to move the seat in accordance with respective adjustments. Further, plural switches are provided to drive their corresponding motors. To perform a desired adjustment, it is only necessary for the driver to press the corresponding switch. As a result, the corresponding motor is driven so that the seat can be moved to the desired position.

The position of a seat is changed upon replacement of the driver or in accordance with the feeling of the driver on each day. The seat position considerably varies by the differences in drivers' heights or the like. Driving at an inadequate seat position involves the potential danger that an accident may be caused by a driving or operation error. It is, therefore, very important to adjust the seat to a position optimal to a new driver whenever the driver changes.

It is, however, very cumbersome for a driver to adjust the seat so frequently as described above. Further, the seat cannot always be adjusted to an optimal position. In an electrically-driven operation, the seat is always moved at a constant speed by motor drive. However, the driver wants to choose different seat moving speeds depending on his feeling. A young or fast driver prefers that a seat moves speedily, whereas a matured driver prefers a seat that moves at a relatively slow speed. Movement of the seat at a speed slower than a desired speed irritates the driver, but movement of the seat at a speed faster than a desired speed surprises the driver. The driver is satisfied by the movement of the seat at an appropriate speed so that he can then drive in comfort.

SUMMARY OF THE INVENTION

An object of this invention is to provide an automotive vehicle seat adjusting system, which can overcome the above problems and permits simple and easy adjustment of a seat in an automotive vehicle.

Another object of this invention is to provide an automotive vehicle seat adjusting system which does not require any switching operation and enables seat adjustment by voice.

A further object of this invention is to provide an automotive vehicle seat adjusting system which can move a seat to an optimal position by a simple operation.

An automotive vehicle seat adjusting system according to the present invention has a drive circuit for moving a seat, a detection circuit for detecting the speed of movement of the seat, a feeling signal input means for inputting a signal indicative of the feeling of a driver to the moving speed of the seat, a fuzzy inference processor and a controller.

When a feeling signal is inputted by the feeling signal input means, the fuzzy inference processor performs fuzzy inference in accordance with a speed decision rule and decides an optimal seat moving speed on the basis of the feeling signal and the moving speed detected by the detection circuit.

The controller controls the drive circuit so that the seat can move at the optimal moving speed decided by the fuzzy inference processor.

BRIEF DESCRIPTION OF THE DRAWINGS

FIG. 4 is a diagram of a speed decision rule for the feeling of a driver and a speed decision rule for actual movement of the seat;

FIG. 9 diagrammatically shows one example of fuzzy inference when a driver has felt "fast"

DESCRIPTION OF THE PREFERRED EMBODIMENT

One embodiment of the present invention will hereinafter be described with reference to the drawings.

Figure 1B:
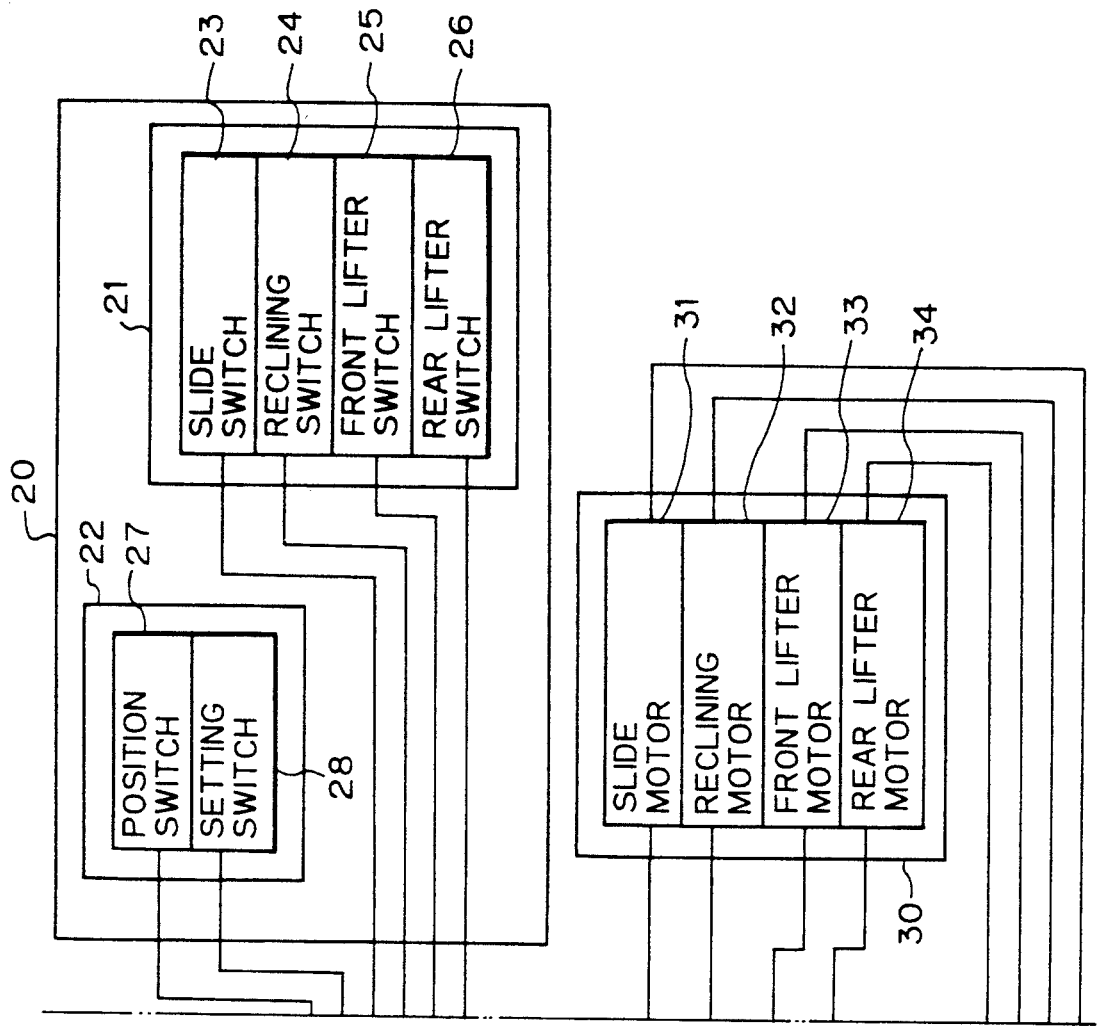
FIG. 1 is a block diagram of an automotive vehicle seat adjusting system according to one embodiment of this invention.

Referring first to FIG. 1, the automotive vehicle seat adjusting system according to one embodiment of this invention is constructed of a control unit 10 for conducting adjustment control of a seat, an input switch unit 20 for inputting a signal for the adjustment of the seat, a seat drive unit 30 for moving the seat, and a microphone 40 for inputting a voice command.

The control unit 10 comprises a microprocessor 11 for conducting control of the whole automotive vehicle seat adjusting system, a data memory 12 for storing data require to adjust and control the seat, a voice recognition processor 13 for performing recognition of a voice from a voice signal inputted through the microphone 40, a fuzzy inference processor 14 for deciding an optimal seat moving speed, a switch signal input controller 15 for controlling an input signal from the input switch unit 20, a seat drive controller 16 for controlling a seat drive unit 30, and a pulse detection controller 17 for detecting the position of the seat. The control unit 10 also comprises a voice recognition memory 18 connected to the voice recognition processor 13 and a rule memory 19 connected to the fuzzy inference processor 14.

The input switch unit 20 comprises a seat adjusting switch unit 21 for instructing a partial adjustment of the seat and a seat setting switch unit 22 for moving the seat to a predetermined position.

The seat adjusting switch unit 21 is equipped with a slide switch 23 for moving the seat back and forth, a reclining switch 24 for changing the inclination of a backrest of the seat, a front lifter switch 25 for moving a front end portion of the seat up and down, and a rear lifter switch 26 for moving a rear end portion of the seat up and down. The seat setting switch unit 22 is equipped with a setting switch 28 for setting an optimal position of the seat and a position switch 27 for moving the seat to the optimal position by a one-touch operation. The input switch unit 20 instructs various adjustments in accordance with inputs by the switches. Its input signals are delivered to the switch signal input controller 15 of the control unit 10.

The seat drive unit 30 includes a slide motor 31, a reclining motor 32, a front lifter motor 33 and a rear lifter motor 34. The seat drive unit 30 drives these motors in accordance with signals from the seat drive controller 16 of the control unit 10, whereby the seat is moved as desired.

The seat adjusting operation by the above system will next be outlined. When the driver wants to move the seat, he selects switches 23-26 corresponding to his desired adjustments from the seat adjusting switch unit 21 and presses them. Input signals are inputted to the microprocessor 11 via the switch signal input controller 15. The microprocessor 11 produces seat-drive-instructing signals on the basis of the input signals and delivers them to the seat drive controller 16.

Based on the signals from the microprocessor 11, the seat drive controller 16 drives and controls corresponding motors 31-34 in the seat drive unit 30. The seat is hence adjusted in accordance with the drive of the motors 31-34. Namely, when the slide motor 31 is driven, the seat moves forward (or rearward). When the reclining motor 32 is driven, the backrest of the seat is inclined forward (or rearward). Drive of the front lift motor 33 causes the front end portion of the seat to move upward (or downward), while drive of the rear lift motor 34 causes the rear end portion of the seat to move upward (or downward). The driver operates one or more of the switches 23-26 to adjust the seat to a position optimal to him.

The microphone 40 is connected to the voice recognition processor 13 and is positioned at a location convenient to receive voice produced by the driver. Based on voice data stored in a voice recognition memory 18, the voice recognition circuit 13 performs recognition of the voice signal inputted through the microphone 40 and delivers it as a voice command to the microprocessor 11. Instead of operating the input switch unit 20, the driver can therefore input similar signals by inputting voice through the microphone 40.

When the driver inputs, for example, "slide" and "forward" by voice through the microphone 40, the microprocessor 11 receives the voice command by way of the voice recognition processor 13, and controls the seat drive controller 16 so that the seat is moved forward. After the adjustment of the seat to the optimal position, the driver can store the position of the seat by pushing a setting switch 28. Namely, an input signal from the setting switch 28 is inputted to the microprocessor 11 via the switch signal input controller 15. Based on each signal from the pulse detection controller 17, the microprocessor 11 detects the driven position of the seat at the corresponding drive position.

The pulse detection controller 17 detects the degrees of rotation of the respective motors 31-34 in the seat drive unit 30 and feed signals to the microprocessor 11. The microprocessor 11 calculates the driven positions on the basis of the data corresponding to the degrees of rotation. The microprocessor 11 stores the thus-calculated position information in the data memory 12.

After the setting described above, the driver can adjust the seat to his optimal position by simply pushing the position switch 27. Namely, input signals from the position switch 27 are inputted to the microprocessor 11 via the switch signal input controller 15. Based on the signals, the microprocessor 11 reads position information from the data memory 12. Further, the microprocessor 11 delivers the position information to the seat drive controller 16, and the seat drive controller 16 then drives the respective motors 31-34 by degrees of rotation determined in accordance with the position information.

The instructions for the setting of the position and the movement of the seat to the position can be effected by the input of a voice command through the microphone 40 in place of the inputs by the seat setting switch unit 22.

When adjustment of the seat is instructed through the input switch unit 20 or the microphone 40, the seat is moved at a constant speed. This moving speed of the seat can be adjusted by a driver's voice input through the microphone 40.

If the driver feels that the moving speed of the seat is fast, the driver speaks "fast" to the microphone 40. This voice signal is inputted as a voice command to the microprocessor 11 via the voice recognition processor 13.

The microprocessor 11 detects an actual moving speed of the seat on the basis of the degree of a change of the motor from the pulse detection controller 17, and delivers data of the voice command and actual moving speed to the fuzzy inference processor 14. In accordance with one of speed decision rules stored in the rule memory 19, the fuzzy inference processor 14 decides an optimal seat moving speed on the basis of the data from the microprocessor 11. Based on the signals from the fuzzy inference processor 14, the microprocessor 11 controls the drive of the respective motors 31-34 via the seat drive controller 16.

The seat adjustment operation will next be described with reference to the flow chart of FIG. 2. The microprocessor 11 confirms input signals from the input switch unit 20 by way of the switch signal input controller 15 (Step S1). When the signals are those inputted from the seat adjustment switch unit 21 (Step S2), the corresponding motors in the seat drive unit 30 are driven through the seat drive control unit 16 (Step S3).

When the driver inputs a signal through the slide switch 23, for example, the microprocessor 11 drives the slide motor 31 via the seat drive controller 16. Accordingly, as long as the driver is holding the slide switch 23 in the ON position, the seat is caused to move forward (or rearward). The microprocessor 11 controls the drive of the motor via the seat drive controller 16 so that the seat can move at an optimal speed (Step S4). This seat moving speed control will be described subsequently herein.

When the microprocessor 11 has confirmed the input of a signal from the setting switch 28 via the switch signal input controller 15 after completion of the seat adjustment (Step S5), it detects, in accordance with signals from the pulse detection controller 17, the seat position corresponding to the drive by the motors 31-34 (Step S6). The microprocessor 11 stores the so-detected seat position data in the data memory 12 (Step S7). When the microprocessor 11 has confirmed the input of a signal from the position switch 27 in Step S2, the microprocessor 11 reads position data stored in the data memory 12 (Step 8).

In accordance with the position data, the microprocessor 11 then successively drives the motors 31-34 of the seat drive unit 30 via the seat drive controller 16. The switch inputs in Step S1, Step S2 and Step S5 can be, as described above, voice commands based on voice inputs through the microphone 40.

Figure 2:
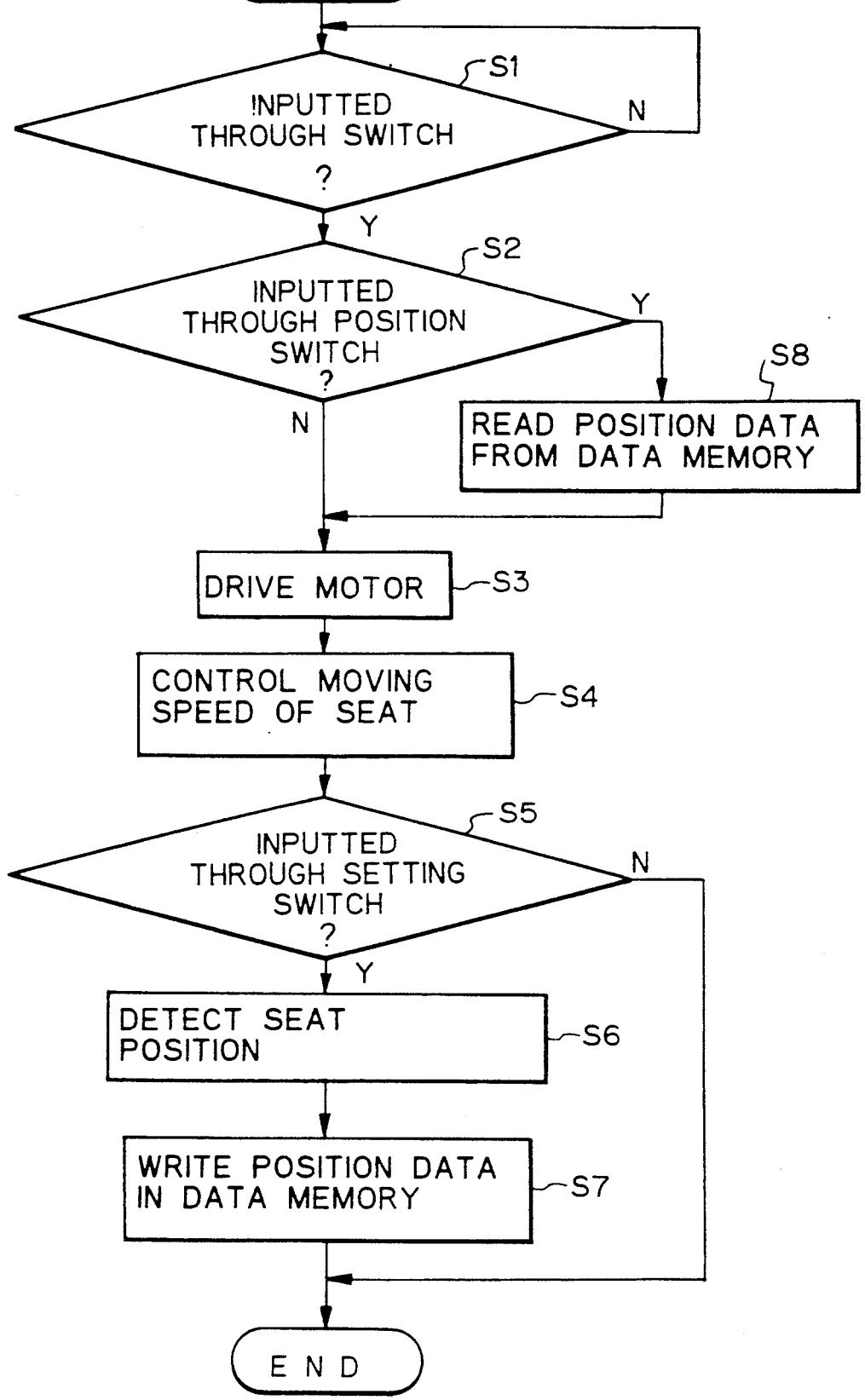
FIG. 2 is a flow chart of a seat adjusting operation.
Figure 3:
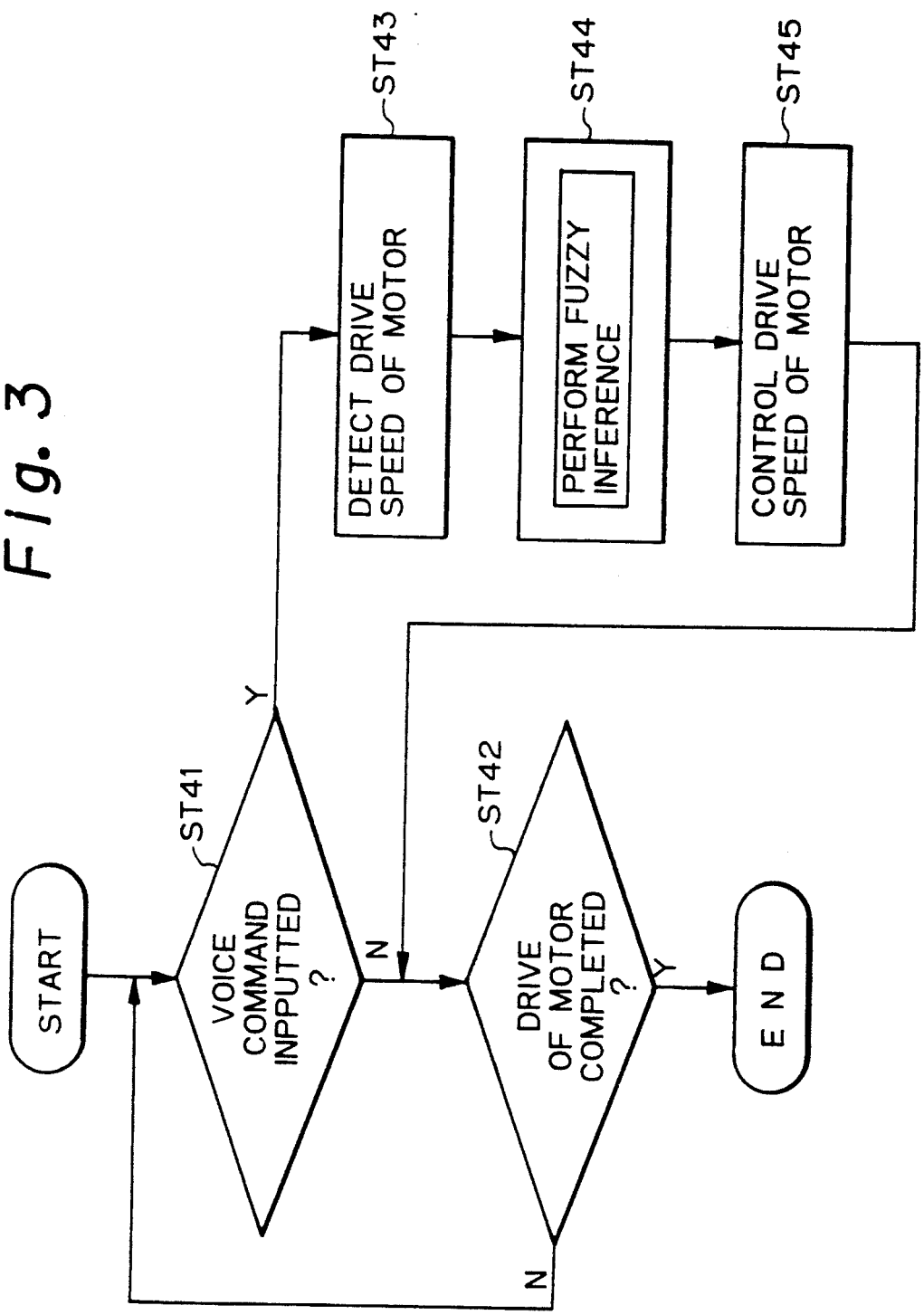
FIG. 3 is a flow chart of control of the moving speed of a seat.

Reference is next had to the flow chart of FIG. 3, which shows the moving speed control of the seat in Step S4 of FIG. 2. Via the microphone 40 and the voice recognition processor 13, the microprocessor 11 detects whether or not a voice command has been inputted while the motor is driven (Steps ST41 and ST42).

When a voice command is inputted, the microprocessor 11 detects the actual moving speed of the seat (Step ST43).

This actual moving speed can be detected, as described above, based on the degree of a change of the motor position from the pulse detection controller 17.

The microprocessor 11 delivers the data of the voice command and actual moving speed to the fuzzy inference processor 14, and the fuzzy inference processor 14 then decides an optimal moving speed in accordance with one of the speed decision rules stored in the rule memory 19 (Step ST44).

An operation at the fuzzy inference processor 14 will be described in detail subsequently.

Based on signals from the fuzzy inference processor 14, the microprocessor 11 controls the drive of the respective motors 31-34 via the seat drive controller 16 (Step ST45). The control of the seat moving speed is finished upon completion of the drive of the motors 31-34 (Step ST42), and the routine then advances to the next step (S5) of FIG. 2.

A description will next be made of the performance of the fuzzy inference at the fuzzy inference processor 14.

The speed decision rule for the feeling of the driver and the speed decision rule for actual movements of the seat, which rules are shown in FIG. 4, are both stored in the rule memory 19.

In this embodiment, the conditions regarding the driver's feeling consist of two kinds of conditions, namely, "slow" and "fast" which the driver inputs by voice command. As conclusions for the inputs, two kinds of conclusions, "make faster" and "make slower" have been set.

Conditions relating to actual movements consist of three kinds of conditions, namely, "slow", "normal" and "fast". As conclusions for these conditions, five kinds of conclusions, "make very slow", "make slower", "keep normal", "make faster" and "make very fast" have been set.

The speed decision rule for the driver's feeling is formulated as follows.

When the driver has felt slow and a voice command has been inputted as "slow", the following rule for increasing the drive speed is applied as a conclusion:

"If slow, then make faster."

When a voice command "fast" has been inputted conversely, the following rule for decreasing the drive speed is applied:

"If fast, then make slower."

Different speed decision rules for actual movements are applied depending on the conditions inputted as voice commands.

Namely, the speed decision rule to be applied when a voice command "slow" is inputted is formulated as follows:

When the actual drive speed is slow, "If slow, then keep normal."

When the actual drive speed is normal, "If normal, then make faster."

When the actual drive speed is fast, "If fast, then make very fast."

On the other hand, the speed decision rule to be applied when a voice command "fast" is inputted is formulated as follows:

When the actual drive speed is slow, "If slow, then make very slow."

When the actual drive speed is normal, "If normal, then make slower."

When the actual drive speed is fast, "If fast, then keep normal."

Incidentally, the speed decision rules described above are merely illustrative and actual speed decision rules are formulated based on simulations, which are conducted repeatedly, and also tuning of membership functions to be described subsequently.

Figure 5:
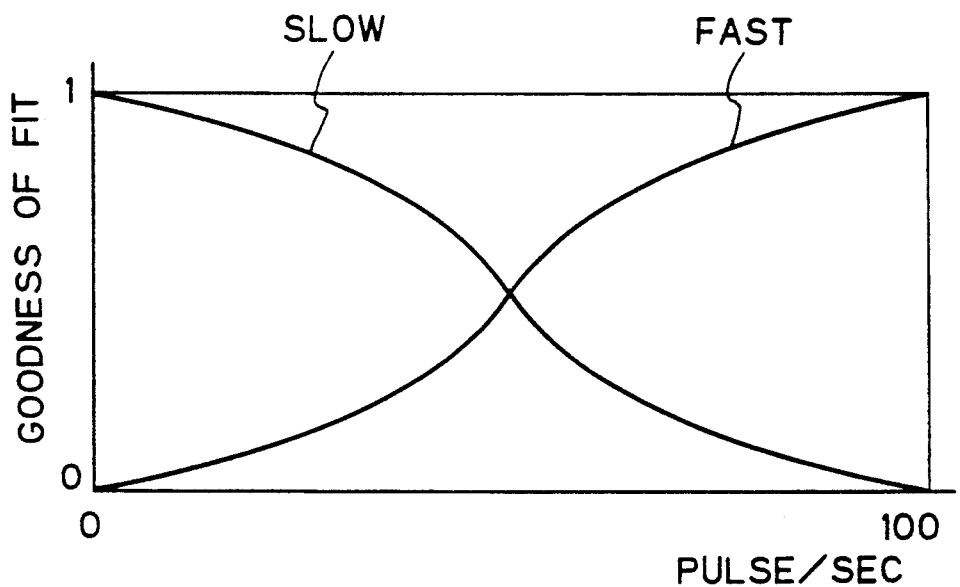
FIG. 5 is a diagram of membership functions for feeling.

Reference is next made to FIG. 5, which diagrammatically illustrates membership functions for drivers' feeling. The diagram indicates that a driver, who feels the moving speed slow, feels it slower than the actual moving speed. In contrast, it is also indicated that a driver, who feels the moving speed fast, feels it faster than the actual moving speed. Although the speed ranges from 0 pulse/sec to 100 pulse/sec in the diagram, any reasonable desired speed can be chosen at will depending on the construction of the seat drive unit 30. The unit "pulse/sec" indicates the revolution speed of the motor and is used as a unit for expressing the distance of each movement of the seat.

Figure 6:
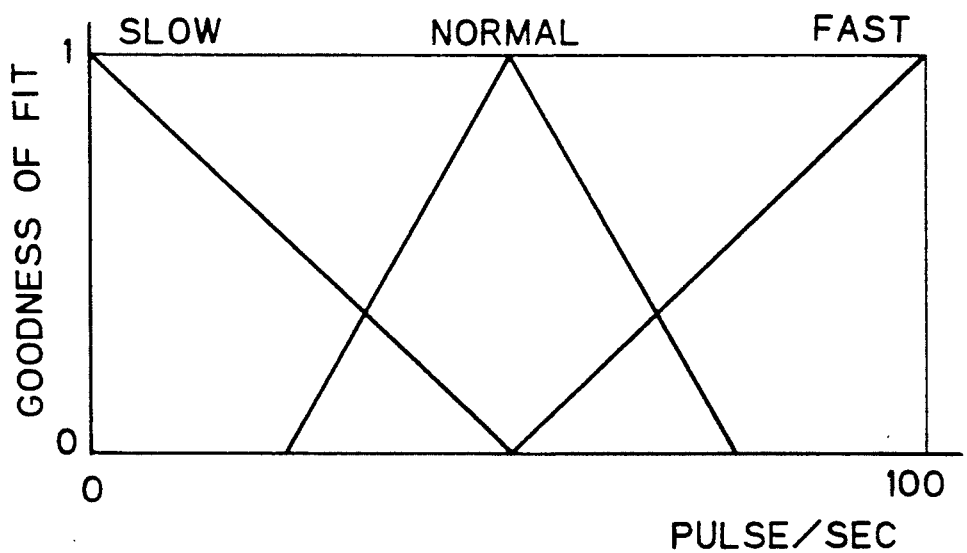
FIG. 6 is a diagram of membership functions for actual movements.

Reference is now made to FIG. 6, which diagrammatically depicts membership functions for actual movements. Conditions relating to actual movements are grouped into three kinds, namely, into "slow", "normal" and "fast" in accordance with actual speeds. Similarly to the membership functions on feeling shown in FIG. 5, the speed ranges from 0 pulse/sec to 100 pulse/sec.

Figure 7:
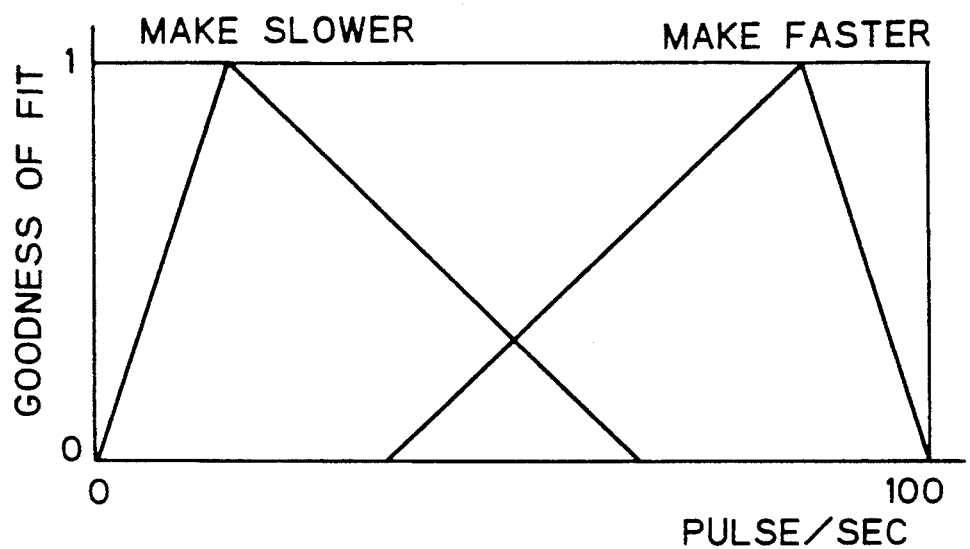
FIG. 7 is a diagram of a fuzzy set on feeling.

The diagram of FIG. 7 shows fuzzy sets for feeling. As has been described above, the conclusions for feeling are divided into two fuzzy sets, namely, "make faster" and "make slower".

Figure 8:
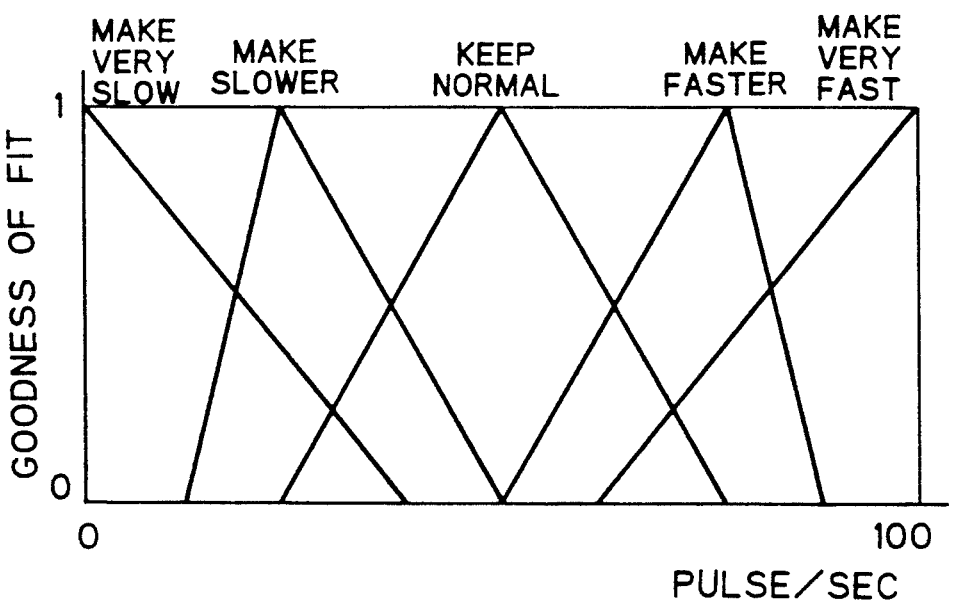
FIG. 8 is a diagram of a fuzzy set on actual movements.

The diagram of FIG. 8 illustrates fuzzy sets for actual movements. The conclusions for the actual movements are divided into five fuzzy sets which consist of "make very slow", "make slower", "keep normal", "make faster" and "make very fast".

Next, fuzzy inference to be performed at the fuzzy inference processor 14 will be described with reference to FIGS. 9(a) to 9(g) and FIGS. 10(a) to 10(g).

FIGS. 9(a) to 9(g) are diagrams for describing one example of fuzzy inference when a driver has felt fast and a voice command "fast" has been inputted.

Upon detection of the input of the voice command "fast", the fuzzy inference processor 14 calculates the goodness-of-fit of the condition "fast" in the membership function for drivers' feeling shown in FIG. 9(a) (as indicated by an arrow in the diagram).

Further, as shown in FIG. 9(b), the fuzzy inference processor 14 chooses, in accordance with the speed decision rule, the conclusion "make slow" in the fuzzy sets for feeling. Moreover, the fuzzy inference processor 14 tops off the conclusion part (the upper part of the curve) in accordance with the goodness-of-fit in FIG. 9(a).

Next, with respect to the membership function for actual movements, the fuzzy inference processor 14 calculates the goodness-of-fit of each of the conditions "fast" and "normal" in accordance with the actual seat drive speed. In FIG. 9(c) and FIG. 9(d), the goodness-of-fit of the respective conditions are indicated by arrows.

When the actual movement is "fast", the fuzzy inference processor 14, as is illustrated in FIG. 9(e), chooses the conclusion "keep normal" in the fuzzy sets for actual movements in accordance with the speed decision rule and then tops off the conclusion part in accordance with the goodness-of-fit in FIG. 9(c).

Further, when the actual movement is "normal", the fuzzy inference processor 14, as is depicted in FIG. 9(f), chooses the conclusion "make slower" in the fuzzy sets for actual movements in accordance with the speed decision rule and then tops off the conclusion part in accordance with the goodness-of-fit in FIG. 9(d).

Then, the fuzzy inference processor 14 determines the logical OR of the above fuzzy sets and the center of gravity of the logical OR. FIG. 9(g) illustrates the logical OR 50 of the fuzzy sets for feeling [FIG. 9(b)] and the fuzzy sets for actual movements [FIG. 9(e) and FIG. 9(f)] and the center of gravity 51 of the logical OR 50.

Next, the fuzzy inference processor 14 converts the center of gravity 51 into a numerical datum and outputs it to the microprocessor 11.

FIGS. 10(a) to 10(g) are diagrams for describing one example of fuzzy inference when a driver has felt slow and a voice command "slow" has been inputted.

Figure 10A:
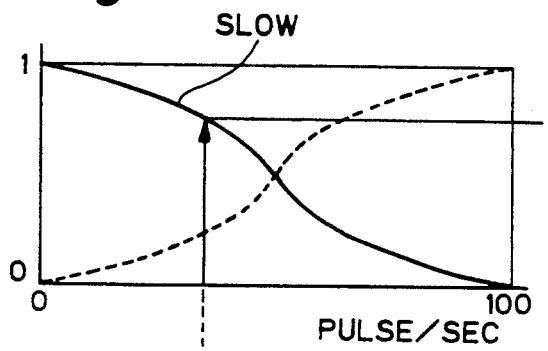
FIG. 10 diagrammatically depicts one example of fuzzy inference when a driver has felt "slow".

Upon detection of the input of the voice command "slow", the fuzzy inference processor 14 calculates the goodness-of-fit of the condition "slow" in the membership function for drivers' feeling shown in FIG. 10(a) (as indicated by an arrow in the diagram).

Figure 10B:
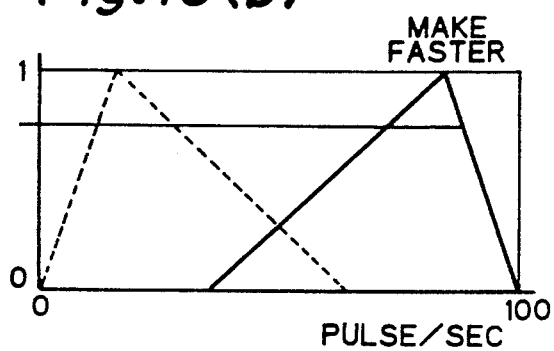

Further, as shown in FIG. 10(b), the fuzzy inference processor 14 chooses, in accordance with the speed decision rule, the conclusion "make faster" in the fuzzy sets for feeling. Moreover, the fuzzy inference processor 14 tops off the conclusion part in accordance with the goodness-of-fit in FIG. 10(a).

Figure 10C:
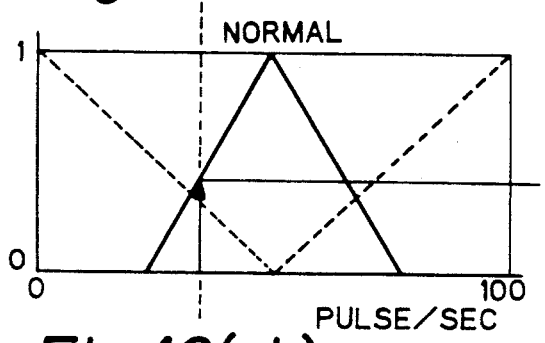

Next, with respect to the membership function for actual movements, the fuzzy inference processor 14 calculates the goodness-of-fit of each of the conditions "normal" and "slow" in accordance with the actual seat drive speed. In FIG. 10(c) and FIG. 10(d), the goodness-of-fit of the respective conditions are indicated by arrows.

Figure 10E:
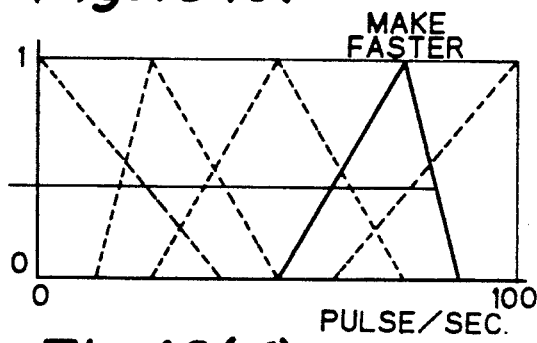
Figure 10D:
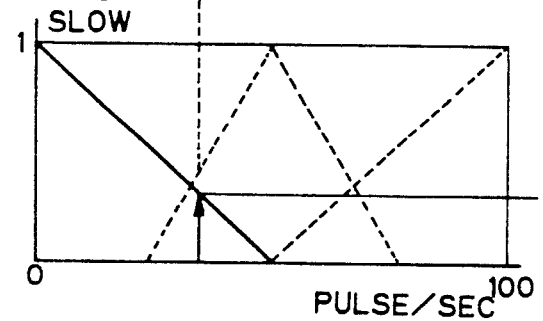

When the actual movement is "fast", the fuzzy inference processor 14, as is illustrated in FIG. 10(e), chooses the conclusion "make faster" in the fuzzy sets for actual movements in accordance with the speed decision rule and then tops off the conclusion part in accordance with the goodness-of-fit in FIG. 10(c).

Figure 10F:
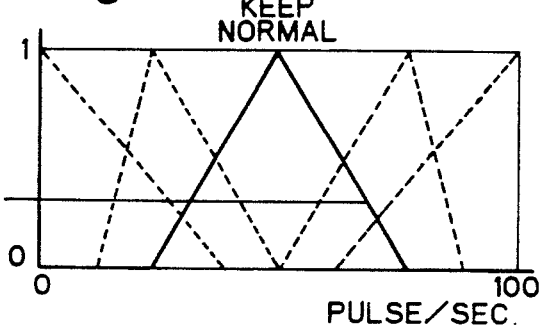

Further, when the actual movement is "slow", the fuzzy inference processor 14, as is depicted in FIG. 10(f), chooses the conclusion "keep normal" in the fuzzy sets for actual movements in accordance with the speed decision rule and then tops off the conclusion part in accordance with the goodness-of-fit in FIG. 10(d).

Figure 10G:
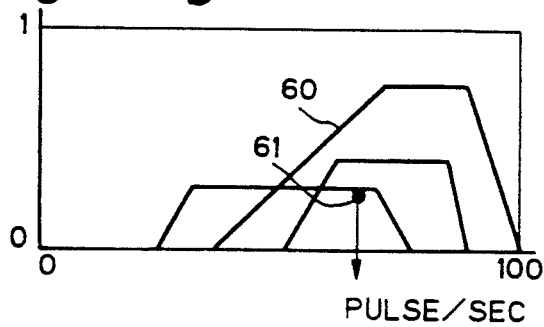

Then, the fuzzy inference processor 14 determines the logical OR of the above fuzzy sets and the center of gravity of the logical OR. FIG. 10(g) illustrates the logical OR 60 of the fuzzy sets for feeling [FIG. 10(b)] and the fuzzy sets for actual movements [FIG. 10(e) and FIG. 10(f)] and the center of gravity 61 of the logical OR 60.

Next, the fuzzy inference processor 14 converts the center of gravity 61 into a numerical datum and outputs the same.

In the above embodiment, the position and moving speed of the seat were detected by the degree of rotation of the motor. They can also be detected by providing sensors which directly detect positions of the seat.

Further, the driver's feeling was inputted by voice in the seat movement control. It is also possible to provide additional switches and to input the feeling by pressing or otherwise actuating the corresponding one of the switches.

It is to be noted that the speed decision rules, membership functions and fuzzy sets employed in the embodiment described above are merely illustrative and, of course, can be modified suitably by repeating simulations.

I claim:

1. An automotive vehicle seat adjusting system comprising:
    a drive circuit for moving an automotive vehicle seat;
    a detection circuit for detecting a moving speed of the seat;
    a feeling signal input means for inputting a signal indicative of the feeling of a driver to the moving speed of the seat;
    a rule memory with speed decision rules stored therein;
    a fuzzy inference processor for performing fuzzy inference in accordance with one of the rules stored in the rule memory to decide an optimal seat moving speed on the basis of the moving speed detected by the detection circuit and the signal inputted by the feeling signal input means; and
    a controller for controlling the drive circuit so that the seat can move at the optimal moving speed decided by the fuzzy inference processor.

2. The system of claim 1, wherein the drive circuit moves the seat by driving a motor provided in a seat drive unit.

3. The system of claim 2, wherein the detection circuit detects drive pulses for the motor and, based on the drive pulses, detects the moving speed of the seat.

4. The system of claim 1, wherein said feeling signal input means comprises a microphone for inputting voice and a voice recognition processor for performing recognition of the voice inputted through the microphone and outputting the same as a voice signal.

5. An automotive vehicle seat adjusting system comprising:
    a drive circuit for moving an automotive vehicle seat;
    a detection circuit for detecting a position and moving speed of the seat;
    a feeling signal input means for inputting a signal indicative of the feeling of a driver to the moving speed of the seat;
    a data memory with seat position data stored therein;
    a rule memory with speed decision rules stored therein;
    a fuzzy inference processor for performing fuzzy inference in accordance with one of the rules stored in the rule memory to decide an optimal seat moving speed on the basis of the moving speed detected by the detection circuit and the signal inputted by the feeling signal input means; and a controller for writing the position of the seat, which has been detected by the detection circuit, as a position datum in the data memory, for reading a position datum stored in the data memory and then to control the drive circuit to move the seat to the position of the position datum, and also for controlling the drive circuit so that the seat can move at the optimal moving speed decided by the fuzzy inference processor.

6. The system of claim 5, wherein the drive circuit moves the seat by driving a motor provided in a seat drive unit.

7. The system of claim 6, wherein the detection circuit detects drive pulses for the motor and, based on the drive pulses, detects the position and moving speed of the seat.

8. The system of claim 5, wherein said feeling signal input means comprises a microphone for inputting voice and a voice recognition processor for performing recognition of the voice inputted through the microphone and outputting the same as a voice signal.

9. The system of claim 5, further comprising a first input means for instructing storage of a position datum of the seat and a second input means for instructing movement of the seat to the position of the position datum, wherein the controller writes the position datum in the data memory in accordance with an input signal from the first input means, reads the position datum stored in the data memory in accordance with the input signal from the second input means and controls the drive circuit to move the seat to the position.

10. The system of claim 5, further comprising a third input means for instructing movement of the seat, wherein the controller controls the drive circuit to move the seat in accordance with an input signal from said third input means.

11. A vehicle seat adjustment system comprising:
 a plurality of manually operable switches by which control signals may be entered by a user;
 a drive circuit for moving the vehicle seat;
 a controller coupled to said switches and said drive circuit; and
 an inference processor coupled to the controller.

12. The system of claim 11 further comprising:
 an input circuit for inputting data for use by the inference processor, the data concerning the speed of seat movement desired by the user.

13. The system of claim 12 wherein said input circuit includes a voice receptor and a voice recognition processor coupled thereto.

14. The system of claim 11 further comprising a rule memory coupled to the inference processor.

15. The system of claim 11 further comprising a speed detector for determining the speed of seat movement, coupled to the inference processor.

16. The system of claim 11 wherein said controller includes a microprocessor and the system further comprises a speed detector coupled to the microprocessor for determining the speed of seat movement.

17. The system of claim 16 further comprising:
 an input circuit for inputting data for use by the inference processor, the data concerning the speed of seat movement desired by the user, wherein said input circuit includes a voice receptor and a voice recognition processor coupled thereto;
 a rule memory coupled to the inference processor; and
 a speed detector for determining the speed of seat movement, coupled to the inference processor.

* * * * *